US009130413B2

(12) United States Patent
Richter et al.

(10) Patent No.: US 9,130,413 B2
(45) Date of Patent: Sep. 8, 2015

(54) ELECTRIC MOTOR HAVING A PARTIALLY SEALED HOUSING

(75) Inventors: Jason A. Richter, Glen Carbon, IL (US); Stephen J. Burton, Fenton, MO (US)

(73) Assignee: Nidec Motor Corporation, St. Louis, MO (US)

( * ) Notice: Subject to any disclaimer, the term of this patent is extended or adjusted under 35 U.S.C. 154(b) by 443 days.

(21) Appl. No.: 13/557,284

(22) Filed: Jul. 25, 2012

(65) Prior Publication Data

US 2014/0030121 A1     Jan. 30, 2014

(51) Int. Cl.
*H02K 5/04*  (2006.01)
*H02K 5/20*  (2006.01)
*H02K 11/00*  (2006.01)
*F04B 17/03*  (2006.01)
*H02K 5/02*  (2006.01)
*H02K 7/14*  (2006.01)

(52) U.S. Cl.
CPC .......... *H02K 5/04* (2013.01); *F04B 17/03* (2013.01); *H02K 5/20* (2013.01); *H02K 11/0073* (2013.01); *H02K 5/02* (2013.01); *H02K 7/14* (2013.01); *Y10T 29/49117* (2015.01)

(58) Field of Classification Search
CPC .......... H02K 5/1282; H02K 5/20; H02K 5/04; H02K 5/10; F04B 17/03
USPC .............. 310/52, 58, 59, 86, 88, 89, 216.021, 310/216.023, 216.019
See application file for complete search history.

(56) References Cited

U.S. PATENT DOCUMENTS

| | | | |
|---|---|---|---|
| 3,673,445 A | 6/1972 | Rutz et al. | |
| 5,006,743 A * | 4/1991 | King et al. | 310/89 |
| 5,016,316 A | 5/1991 | McAllise et al. | |
| 5,287,030 A * | 2/1994 | Nutter | 310/89 |
| 5,825,107 A | 10/1998 | Johnson et al. | |
| 5,969,445 A | 10/1999 | Horiuchi et al. | |
| 6,348,752 B1 * | 2/2002 | Erdman et al. | 310/216.023 |
| 6,394,767 B1 | 5/2002 | Matsumoto | |
| 6,577,030 B2 * | 6/2003 | Tominaga et al. | 310/68 B |
| 6,713,907 B2 | 3/2004 | Matsumoto | |
| 6,762,521 B2 | 7/2004 | Peter et al. | |
| 6,998,740 B2 | 2/2006 | Matsuki | |
| 7,411,323 B2 * | 8/2008 | Pfannschmidt et al. | 310/58 |
| 7,741,741 B2 | 6/2010 | Weinmann et al. | |
| 7,863,786 B2 | 1/2011 | Weinmann et al. | |
| 8,067,864 B2 | 11/2011 | Beetz | |
| 8,110,958 B2 | 2/2012 | Kalavsky et al. | |
| 2004/0098999 A1 | 5/2004 | Hyvarinen et al. | |
| 2005/0116554 A1 | 6/2005 | Dano et al. | |
| 2006/0208582 A1 | 9/2006 | Marioni | |
| 2007/0286752 A1 * | 12/2007 | Hanke et al. | 417/423.7 |

(Continued)

FOREIGN PATENT DOCUMENTS

WO     WO 2010099974 A2 *   9/2010

*Primary Examiner* — Thomas Truong
(74) *Attorney, Agent, or Firm* — Maginot Moore & Beck LLP

(57) ABSTRACT

An electric motor has been developed that includes a housing to prevent particles from exiting one compartment of the motor, while enabling air flow through another compartment of the motor. The enclosed compartment includes a printed circuit board having a plurality of electronics components to prevent debris produced by a catastrophic failure of an electronic component from escaping the housing. Vents are provided in a separate portion of the housing to enable air to circulate about the primary components of the motor.

8 Claims, 4 Drawing Sheets

(56) References Cited

U.S. PATENT DOCUMENTS

2008/0018182 A1 1/2008 Weinmann et al.
2009/0078489 A1* 3/2009 Feier et al. .................. 180/339
2009/0079281 A1 3/2009 Best et al.
2011/0293450 A1 12/2011 Grimes et al.
2012/0133221 A1* 5/2012 Leiber et al. .................. 310/54

* cited by examiner

ELECTRIC MOTOR HAVING A PARTIALLY SEALED HOUSING

TECHNICAL FIELD

The present disclosure relates to electric motors, and more particularly to housings for electric motors.

BACKGROUND

Electric motors are used in various household, office, automotive, and industrial applications. A typical electric motor includes a rotor surrounded by an electromagnet, called a stator. When varying electrical energy is applied to the stator, a magnetic field is generated that produces a torque on the rotor, spinning the rotor. The rotor includes an output shaft that connects to a device, such as a pump, fan, belt, or gear, to operate the device with the rotational output of the motor. A motor can also include electronic components configured to receive electrical energy and to vary the amount, frequency, and phase of the electric power delivered to the motor, controlling the torque generated in the rotor and the speed at which the rotor spins.

As a motor is operated, the components of the motor and the electronic control components generate heat. If a motor generates excessive heat, the motor components may degrade and the electronic components may be damaged. Typically, electric motors are ventilated to enable air to cool the components and reduce overheating. However, some electronic components may fragment upon failure, producing debris that can escape a motor in which electronic components are ventilated. In some applications, debris exiting the motor can cause issues outside the motor and damage to nearby components. Therefore, avoidance of overheating in electric motors and containment of debris from catastrophic failure of electronic components are beneficial goals of electric motor design.

SUMMARY

In one embodiment, an electric motor has been developed to better contain debris arising from catastrophic failure. The electric motor comprises a rotor, a stator, a printed circuit board, and a housing. The rotor is fixedly mounted about a shaft, and the stator is mounted about the rotor. A plurality of electronic components are mounted on the printed circuit board. The printed circuit board further includes one connector configured to electrically connect the electronic components to a source of electrical energy and at least a pair of conductors configured to electrically connect the electronic components to the stator to enable the stator to produce magnetic fields that rotate the rotor and the shaft. The housing is configured to cover the printed circuit board and at least a first portion of the stator. The housing also has at least one opening to enable air from about a second portion of the stator to flow outside the housing, and the housing overlaps the stator to prevent a flow of debris from about the first portion of the stator and the printed circuit board to the at least one opening in the housing.

In another embodiment a pump has been developed to better contain debris arising from catastrophic failure. The pump comprises a rotor, a stator, a printed circuit board, a housing, a pump casing, and an impeller. The rotor is fixedly mounted about a shaft and the stator is mounted about the rotor. A plurality of electronic components are mounted on the printed circuit board. The printed circuit board further includes one connector configured to electrically connect the electronic components to a source of electrical energy, and at least a pair of conductors configured to electrically connect the electronic components to the stator to enable the stator to produce magnetic fields that rotate the rotor and the shaft. The housing is configured to cover the printed circuit board and at least a first portion of the stator. The housing also has at least one opening to enable air from about a second portion of the stator to flow outside the housing, and the housing overlaps the stator to prevent a flow of debris from about the first portion of the stator and the printed circuit board to the at least one opening in the housing. The pump casing is coupled to the housing outside the portion of the housing about the first portion of the stator and the printed circuit board. The impeller is inside the pump casing and fixedly connected to an end of the shaft that is outside the housing. The impeller is configured to rotate with the shaft to move a fluid within the pump casing.

In yet another embodiment a method of manufacturing an electric motor provides a housing that better contains debris arising from catastrophic failure. The method comprises fixedly mounting a rotor to a shaft; mounting a stator about the rotor; attaching a connector to a printed circuit board to enable electronic components on the printed circuit board to connect to a source of electrical energy; attaching at least a pair of conductors between the printed circuit board and the stator to enable the stator to produce magnetic fields that rotate the rotor and the shaft; and fitting a housing over the printed circuit board and at least a first portion of the stator, the housing configured to overlap the stator to prevent a flow of debris from about the first portion of the stator and the printed circuit board to at least one opening in the housing.

DETAILED DESCRIPTION

Figure 3:
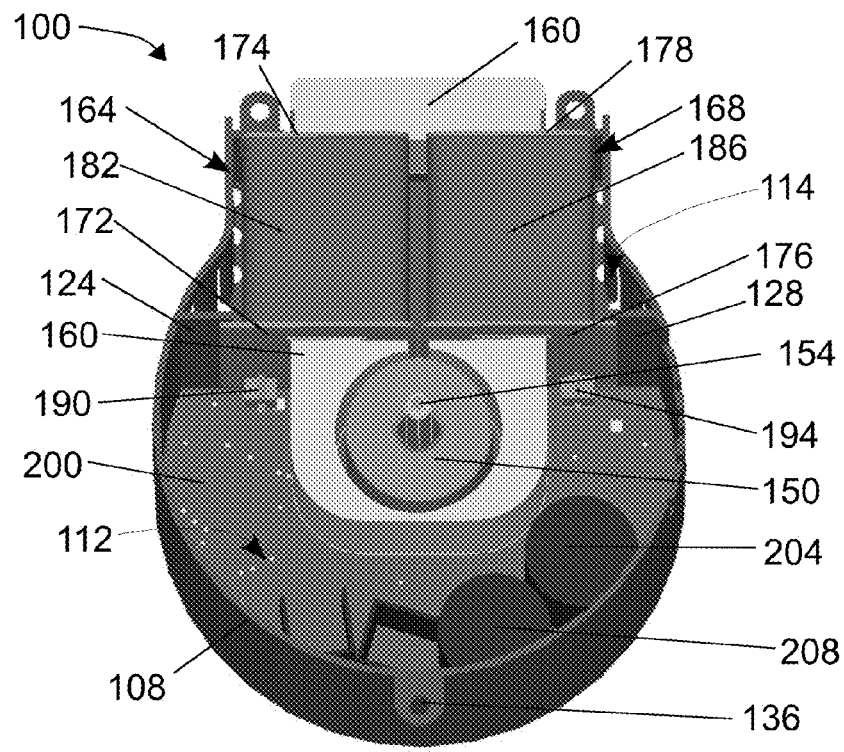
FIG. 3 is a front perspective view of the electric motor of FIG. 1-FIG. 2 with the rotor well removed for clarity.

An electric motor 100 having a new and improved housing is illustrated in FIG. 1-FIG. 8. The electric motor 100 includes a housing 104, a rotor 150 (FIG. 3), a stator 160, and a printed circuit board 200 (FIG. 3). The housing 104 includes a cover 108 and a rotor well 140. In the illustrated embodiment the cover 108 includes tabs 136 configured to align with tabs 148 on the rotor well 140 having a hole with threads suitable to engage a threaded member, for example a screw, to enable the cover 108 to couple with the rotor well 140 to form a first compartment 112 (FIG. 3 and FIG. 4) and a second compartment 114 (FIG. 3). In other embodiments the cover and rotor well can be attached by another suitable mechanism to form the first and second compartments. The first compartment 112 is configured to prevent debris from exiting the first compartment 112 should catastrophic failure of any electronic component occur in the first compartment 112. A plurality of side vents 116 are positioned on each side of the cover 108 around the second compartment 114, orthogonal to a plurality of top vents 118 on the cover 108 over the second compartment 114, enabling air to enter the second compartment 114 to ventilate and dissipate heat from the stator 160, the rotor 150, and the printed circuit board 200. The vents 116 and 118 are depicted as slots in FIG. 2. The second compartment 114 also includes an opening 120 in the cover 108 for a portion of the stator 160 to extend outside the second compartment 114 to further facilitate cooling of the stator 160 by air outside the housing 104.

Figure 1:
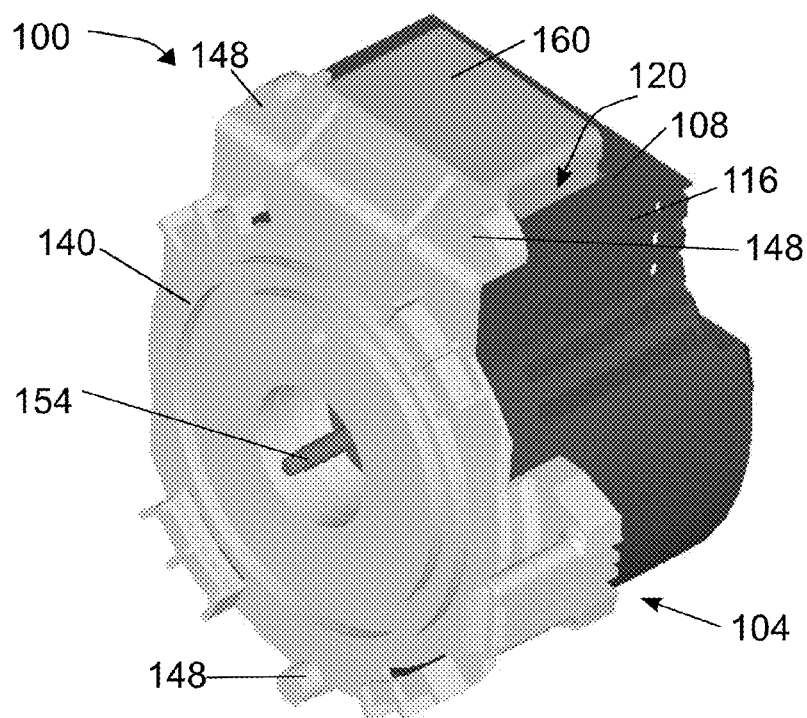
FIG. 1 is a bottom perspective view of an electric motor.
Figure 2:
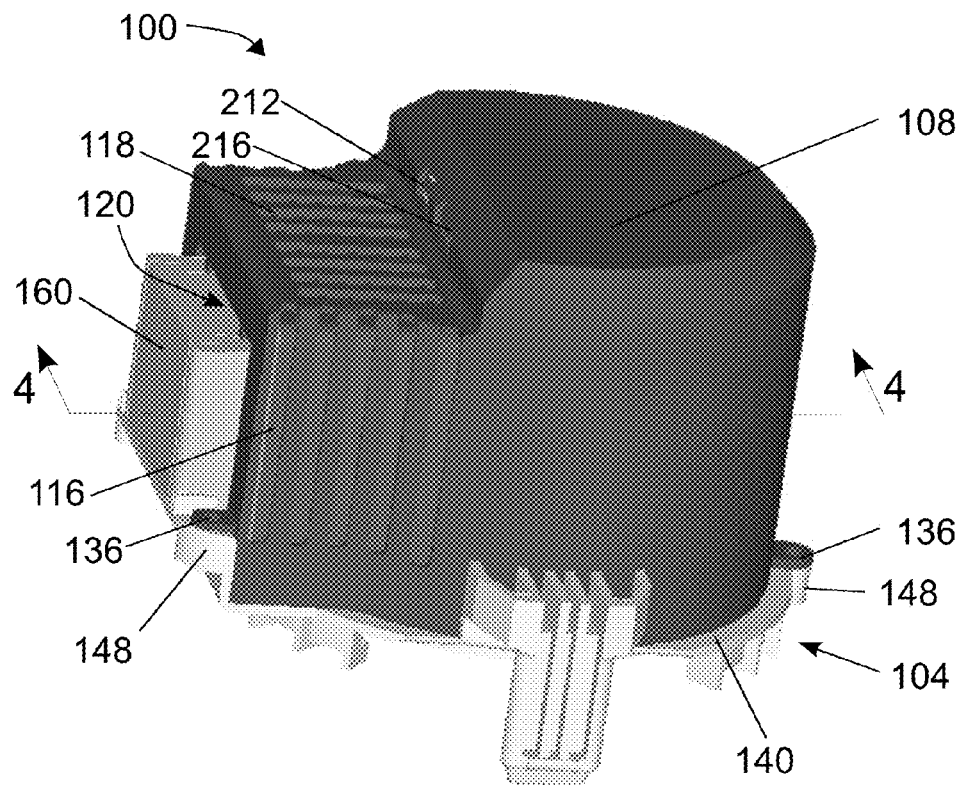
FIG. 2 is a side perspective view of the electric motor of FIG. 1.
Figure 4:
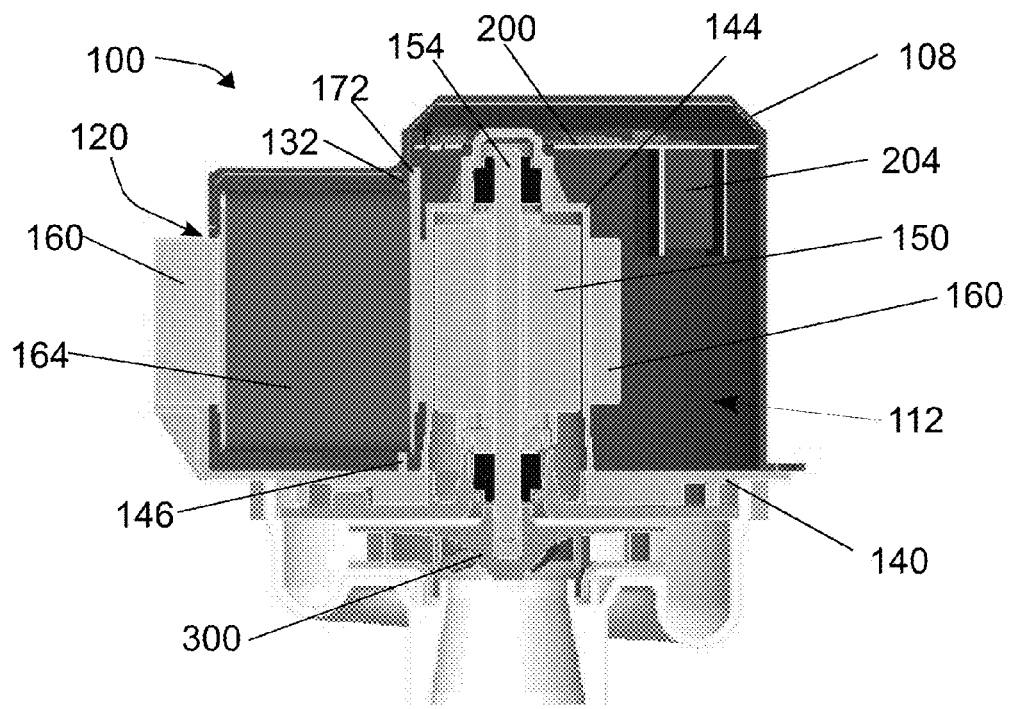
FIG. 4 is a cross-sectional view of the motor of FIG. 1-FIG. 3 taken along line 4-4 of FIG. 2.
Figure 5:
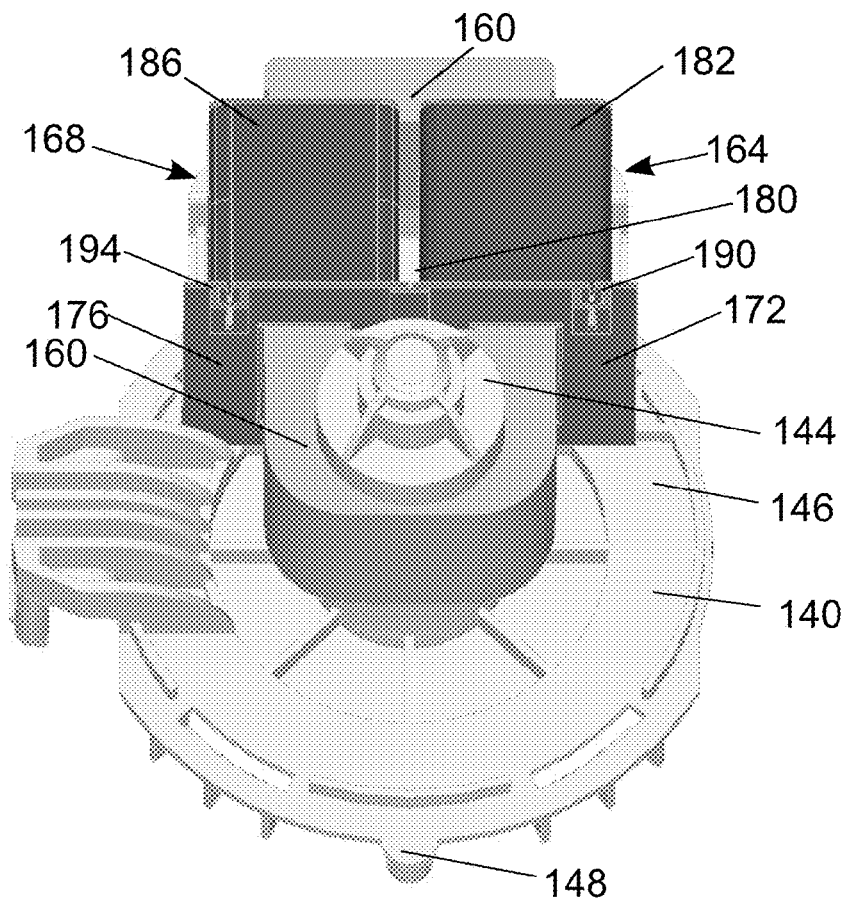
FIG. 5 is a top perspective view of the motor of FIG. 1-FIG. 4 with the cover and printed circuit board removed for clarity.

Referring to FIG. 4 and FIG. 5, the rotor 150 is surrounded by a rotor enclosure 144, formed in the rotor well 140, separating the rotor 150 from the first compartment 112. The rotor 150 is fixedly mounted to and configured to rotate an output shaft 154 that extends beyond the bottom of the rotor well 140 (FIG. 1). In the illustrated embodiment the output shaft 154 is configured to couple with a pump impeller 300 (FIG. 4) to transmit rotational movement of the rotor to the pump impeller 300. In other embodiments the output shaft rotates a fan, belt, gear, cam or other device. The rotor 150 is substantially cylindrical and is formed of any suitable material and can be any suitable type of rotor, for example a squirrel cage rotor, which rotates in response to a magnetic field being generated by the stator 160. The stator 160 partially surrounds the rotor enclosure 144 and the rotor 150 to enable the magnetic field generated by the stator 160 to generate a torque in the rotor 150. In alternative embodiments the stator can completely surround the rotor enclosure. A small gap between the rotor 150 and rotor enclosure 144 enables the rotor 150 to rotate freely within the rotor enclosure 144.

The stator 160 is formed of a plurality of layers of a ferromagnetic material arranged in a manner known in the art. The stator 160 partially surrounds the rotor 150 and the rotor enclosure 144 in the first compartment 112, and includes two stator arms, each extending from the first compartment 112, through the second compartment 114, and outside the opening 120 in the cover 108, where the stator arms are connected to one another. The stator 160 includes a first bobbin 164 and a second bobbin 168, which each surround one of the stator arms in the second compartment 114. The first bobbin 164 includes flanges 172 and 174 and a first wire coil 182, while the second bobbin 168 includes flanges 176 and 178 and a second wire coil 186. Flanges 172 and 174 are mounted on each end of the first bobbin 164, and the first wire coil 182 wraps multiple times around the stator 160 between the flanges 172 and 174. The second bobbin 168 is configured identically to the first bobbin 164 with the second wire coil 186 wrapping multiple times around the stator 160 between the flanges 176 and 178, which are on each end of the second bobbin 168. The wire coils 182 and 186 can be formed of copper wire or any other suitable electrically conductive material. The first 182 and second 186 wire coils are operatively connected to the printed circuit board 200 by wires that run through stator power connectors 190 and 194, respectively, to enable the printed circuit board 200 to deliver electric current to the wire coils 182 and 186. Electric current flowing through the wire coils 182 and 186 magnetizes the stator 160, generating a fluctuating magnetic field around the stator 160 that produces a torque on the rotor 150, which spins in response to the torque. The frequency and timing of the electric current delivered to the wire coils 182 and 186 determines the rotation of the magnetic field and therefore the speed at which the rotor 150 spins.

The printed circuit board 200 is located within the first compartment 112 above the rotor 150 and stator 160 (FIG. 4), and in the illustrated embodiment the printed circuit board 200 is orthogonal to the rotor shaft 154. The printed circuit board 200 includes a plurality of electronic components, including capacitors 204 and 208, operatively connected by conductive pathways on the board 200. The printed circuit board 200 is operatively connected to power connectors 212 and 216 (FIG. 2), which are configured to couple with one or more wires to receive electric power from a source of electrical energy and control signals from an external controller (not shown). The electronic components on printed circuit board 200 control the frequency and phase of the electrical power delivered through the stator power connectors 190 and 194 to the wire coils 182 and 186 with reference to the signals from the controller. Thus, the controller and the electronics regulate the speed at which the rotor 150 rotates.

FIG. 5 depicts a top perspective view of the motor with the top cover of the housing and the printed circuit board removed to show the elements inside the housing more clearly. The flange 172 on the first bobbin 164 is positioned proximate to the flange 176 on the second bobbin 168, both of which extend substantially from the top of cover 108 to the rotor well 140 within the housing 104. Flange 172 on the first bobbin 164 includes an extension 180 on the top portion of the flange 172 that is configured to overlap the flange 176 on the second bobbin 168 to enable the extension 180 to prevent debris from escaping the first compartment 112 through the space between the top portion of the two flanges 172 and 176. Particles are prevented from escaping between the bobbin flanges 172 and 176 below the extension 180 by the rotor 150 and stator 160, each of which helps block direct flow of particles into the gap between the bobbin flanges 172 and 176.

The bobbin flanges 172 and 176 tightly surround the arms of the stator 160, preventing debris from escaping the first compartment between the flanges 172 and 176 and the stator 160. The rotor enclosure 144, formed as part of the rotor well 140, surrounds the rotor 150 and output shaft 154 to seal the rotor 150 from any debris in the first compartment 112. Thus, debris is prevented from escaping the first compartment 112 through the rotor enclosure 144 in the event of catastrophic failure of the electronic components in the first compartment.

Figure 6:
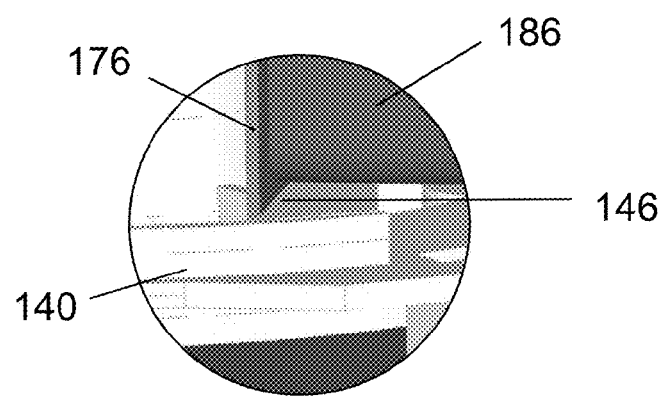
FIG. 6 is a detail view of a bottom sealing strip and a bobbin in the motor of FIG. 1-FIG. 5.

As shown in more detail in FIG. 6, the bobbin flanges 172 and 176 overlap with a bottom strip 146 formed as part of the rotor well 140. The bottom strip 146 stretches across a width of the rotor well 140 and extends upwardly from the bottom of rotor well 140, overlapping with the flanges 172 and 176. The overlap of the bottom strip 146 and flanges 172 and 176 acts to prevent debris from travelling from the first compartment 112 to the second compartment 114 under the bobbin flanges 172 and 176.

Figure 7:
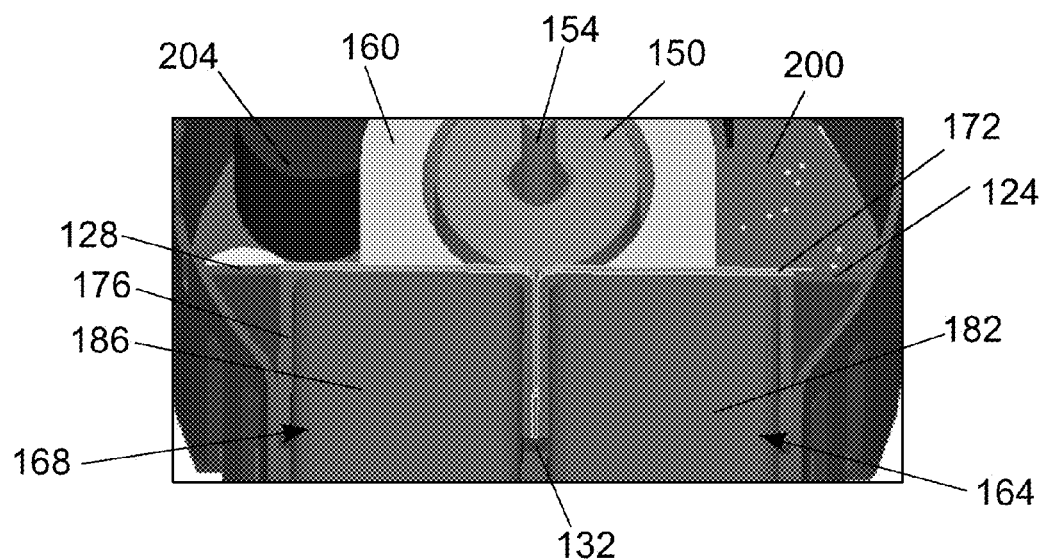
FIG. 7 is a detail view of the bobbins and cover of the motor of FIG. 1-FIG. 6.

FIG. 7 illustrates a bottom perspective detail view of the first 164 and second 168 bobbins overlapping with the cover 108. This view has the rotor well removed for clarity. A top strip 132, formed as part of the cover 108, extends downwardly across a width of the cover 108. The top portions of flanges 172 and 176 overlap with the top strip 132 to inhibit the movement of particles from the first compartment 112 to the second compartment 114 above the bobbin flanges 172 and 176. Each bobbin flange 172 and 176 includes holes (not shown) to enable a wire to connect the stator power connectors 190 (FIG. 8) and 194 (FIG. 3) with the wire coils 182 and 186, respectively. The holes are sized to enable a wire carrying electric power to fill the holes and prevent particles from exiting the first compartment through the holes.

Figure 8:
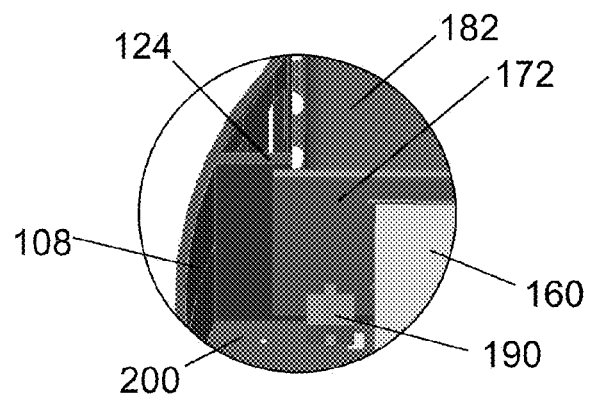
FIG. 8 is a detail view of a side strip and a bobbin in the motor of FIG. 1-FIG. 7.

As shown in FIG. 7 and FIG. 8, the top cover 108 includes two side strips 124 and 128 running from the top of cover 108 to the bottom of rotor well 140 and extending inwardly from the sides of the cover 108. The side strips 124 and 128 are configured to overlap the outside edges of the bobbin flanges 172 and 176, respectively, to prevent particles from escaping from the first compartment 112 around the outside of the bobbin flanges 172 and 176. The bottom of side strips 124 and 128 form a close fit with the rotor well to prevent particles from exiting the first compartment 112 under the side strips 124 and 128. Overlapping the bobbin flanges 172 and 176 with the side strips 124 and 128, the top strip 132 of the cover 108, and the bottom strip 146 of the rotor well 140 reduces the flow of air between the first 112 and second 114 compartments. This reduction in air flow helps eliminate the transfer of debris between the compartments 112 and 114 in the event of catastrophic failure of the electronics components.

The cover 108 can be formed of a flame resistant thermoplastic, for example polybutylene terephthalate, polypropylene, or nylon, to prevent ignition of the cover 108 upon overheating or failure of the electronics components. Alternatively, the portion of the cover 108 forming the first compartment 112 can be formed of a flame resistant plastic while the portion of the cover 108 forming the second compartment 114 can be a different plastic or other material. Although the embodiment of FIG. 1-FIG. 8 includes a cover over the second compartment, in other embodiments the housing can be formed with a sealed first compartment and a second compartment including only an opening completely exposing the bobbins and the portion of the stator outside the first compartment to the air, enabling the outside air to ventilate the coils and stator.

During motor assembly, the cover 108 is fitted to the flanges of the bobbins to enclose the first compartment 112, while also providing vents 116 and 118 that enable air circulation through the second compartment 114. The cover 108 is attached to the rotor well 140 by threaded members that extend through cover tabs 136 and into the rotor well tabs 148 to enable the cover 108 to engage the rotor well 140, preventing movement of debris from the first compartment 112 outside the housing 104 or to the second compartment 114. Wires connected to the electrical energy source and controller that also terminate into connectors are mated to the connectors 212 and 216 to provide electrical power and controller signals to the electronic control board 200. The motor is then installed in an appliance or other apparatus with the output shaft coupled to the pump or other device to be operated by the motor. Thereafter, typically in response to a start signal, the controller closes a switch to enable electrical power to be supplied to the electronics and the motor along with the control signals used by the electronics to regulate the electrical power. The primary components should remain in an appropriate temperature zone as air circulates through the vents 116 and 118 of the second compartment 114. Should any electronic component catastrophically fail and produce debris, the walls of the cover 108, rotor well 140, and bobbin flanges 172 and 176 enclosing the first compartment 112 contain any debris produced. Thus, a housing 104 is constructed to form two different compartments of an electric motor in a way that enables air circulation about the primary components of the motor, while inhibiting airflow in the compartment in which the electronic components are installed to prevent egress of debris from that compartment.

It will be appreciated that several of the above-disclosed and other features, and functions, or alternatives thereof, can be desirably combined into many other different systems or applications. Various presently unforeseen or unanticipated alternatives, modifications, variations, or improvements therein can be subsequently made by those skilled in the art, which are also intended to be encompassed by the following claims.

What is claimed is:

1. An electric motor comprising:
   a rotor fixedly mounted about a shaft;
   a stator having a bobbin, the stator being mounted about the rotor;
   a printed circuit board on which a plurality of electronic components are mounted, the printed circuit board including one connector configured to electrically connect the electronic components to a source of electrical energy, and at least a pair of conductors configured to electrically connect the electronic components to the stator to enable the stator to produce magnetic fields that rotate the rotor and the shaft; and
   a housing configured to cover the printed circuit board and at least a first portion of the stator, the housing having at least one opening to enable air from about a second portion of the stator to flow outside the housing and the housing overlapping the bobbin of the stator to prevent a flow of debris from about the first portion of the stator and the printed circuit board to the at least one opening in the housing.

2. The electric motor of claim 1 wherein the printed circuit board is orthogonal with a longitudinal centerline through the shaft and a first portion of the printed circuit board extends past the longitudinal centerline through the shaft, the first portion of the printed circuit board being larger than a second portion of the printed circuit board that overlies the first portion of the stator, the rotor, and the shaft.

3. The electric motor of claim 2 wherein one of the electronic components is a capacitor that extends from a plane of the printed circuit board in a direction that is parallel to the centerline through the shaft.

4. The electric motor of claim 1, the at least one opening in the housing further comprising:
   a first plurality of slots in the housing, each slot in the plurality of slots enabling air from about the second portion of the stator to flow outside the housing to dissipate heat from the stator.

5. The electric motor of claim 4 further comprising:
   a second plurality of slots in the housing, the second plurality of slots being arranged orthogonally to the first plurality of slots.

6. The electric motor of claim 1 further comprising:
   a pump operatively connected to an end of the shaft extending past the housing.

7. The electric motor of claim 1 wherein the housing is essentially comprised of thermoplastic material.

8. The electric motor of claim 1 further comprising:
   a rotor enclosure formed as part of the housing and positioned between the rotor and the first portion of the stator, the rotor enclosure sealing the rotor from the first portion of the stator and the printed circuit board.

* * * * *